United States Patent Office 2,867,625
Patented Jan. 6, 1959

2,867,625

CERTAIN 2-OLEFINOXYMETHYL IMIDAZOLINES

George E. Ham and Alfred B. Craig, Decatur, Ala., assignors to The Chemstrand Corporation, Decatur, Ala., a corporation of Delaware No Drawing. Original application December 15, 1954, Serial No. 475,556. Divided and this application November 12, 1957, Serial No. 701,280

6 Claims. (Cl. 260—309.6)

This invention relates to new and valuable acrylonitrile polymers. More particularly, the invention relates to fiber-forming acrylonitrile polymers, which are dyeable by conventional dyeing procedures utilizing acid dyestuffs, and to new and useful monomers which are copolymerizable with acrylonitrile.

This application is a division of our copending application Serial No. 475,556, filed December 15, 1954, which is a continuation-in-part of our copending application, Serial No. 206,916, filed January 19, 1951, now abandoned.

It is well known that polyacrylonitrile and copolymers of acrylonitrile and other polymerizable mono-olefinic monomers, such as styrene and vinyl acetate, are excellent fiber-forming compositions. It is also well known that the copolymerized monomer may influence the chemical and physical characteristics of the resultant copolymer.

Accordingly, the primary purpose of this invention is to provide comonomers which will produce superior fiber-forming polymers having the desirable physical properties of synthetic polyacrylonitrile fibers and at the same time have the desired chemical properties of natural fibers. The further object of the invention is to provide different polymeric substances suitable for improving acrylonitrile polymers by blending, especially for the purpose of developing dye-affinity. Another object of the invention is to provide a new class of monomers which are copolymerizable with acrylonitrile to produce superior fiber-forming polymers. Other objects and advantages of the present invention will be apparent from the description thereof hereinafter.

In accordance with this invention, it has been found that various N-heterocyclic nitrogen compounds containing olefinic functions may be copolymerized with acrylonitrile to develop improved dye-receptivity. Suitable N-heterocyclic monomers for copolymerization with acrylonitrile are the unsaturated imidazolines, which contain olefinic unsaturation in a side chain, having the general formula:

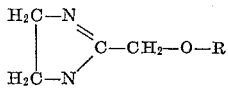

wherein R is an alkenyl radical selected from the group consisting of vinyl, allyl, methallyl, ethallyl and isopropenyl. Examples of suitable monomers having the above general formula are: 2-allyloxymethylimidazoline, 2-vinyloxymethylimidazoline, 2 - ethallyloxymethylimidazoline, 2-methallyloxymethyl imidazoline, and 2-isopropenyl-oxymethyl imidazoline.

In general, the new monomers of the instant invention are prepared by reacting an alkenyloxyacetonitrile with methanol and dry hydrogen chloride to obtain the corresponding imido ester hydrochloride. This product is then reacted with ethylenediamine to give the corresponding alkenyloxymethyl imidazoline which is separated by means of distillation, and particularly vacuum distillation. Further details with respect to the preparation of the new monomers of the instant invention are set out in the specific examples hereinafter.

In the preparation of copolymers of the above unsaturated cyclic compounds and acrylonitrile it has been found desirable to use from 1 to 15% of the N-heterocyclic compound and to polymerize in the presence of from 85 to 99% of acrylonitrile. It has also been found that the above N-heterocyclic monomers may be introduced into the fiber spinning polymers by a blending technique and in accordance with this method the N-heterocyclic compound is polymerized by itself or in the presence of other mono-olefinic monomers. For this purpose the other monomers may be vinyl chloride, vinyl acetate, acrylonitrile, styrene, methacrylonitrile, methyl methacrylate, vinylidene chloride, diethyl maleate, dimethyl fumarate, or homologues of these compounds, and in general, any olefinic monomer which is copolymerizable with the N-heterocyclic monomers. The polymers of the N-heterocyclic compounds for use in the blending procedures will be polymers of 30 to 100% of the N-heterocyclic monomers and up to 30% of the other monomer. In the use of the blending technique it is desirable to use a sufficient quantity of the blending polymer so as to provide from 1 to 15% of the cyclic monomer in polymerized form in the fiber spinning polymer.

When the blending technique is used in accordance with this invention the principal polymer may be polyacrylonitrile or it may be a copolymer of acrylonitrile with minor proportions of other monomers copolymerizable therewith, for example, vinyl acetate, styrene, methacrylonitrile, vinyl chloride, methyl acrylate, diethyl fumarate, dimethyl maleate, or homologues thereof. At least 80% of the acrylonitrile should be used and preferably in excess of 90%. The blends will utilize from 50 to 99% of the principal copolymer and from 1 to 50% of the blending polymer depending upon the amount of N-heterocyclic monomer in the blending polymer.

The blends may be prepared by a wide variety of methods, but for optimum mixing it is desirable to perform the blending when both are dissolved in a common solvent. Suitable solvents for practicing the dispersion will be the same solvents from which the blended polymer is spun into fibers, for example, N,N-dimethylformamide, ethylene carbonate, gamma-butyrolactone, alpha-cyano-acetamide, N,N-dimethylacetamide, maleic anhydride, or other solvents known to have the property of dissolving polyacrylonitrile and high acrylonitrile copolymers. The copolymers of acrylonitrile and the above described N-heterocyclic monomers, the blending polymers of the N-heterocyclic monomers, and the principal polymer with which the blending polymer is mixed may all be prepared by the so-called emulsion or suspension polymerization method in aqueous medium. These polymerizations usually require a free radical type of catalyst and emulsifying or dispersing agents. The methods of preparation preferably utilize a mixed monomer addition technique whereby the monomers are mixed in the proportions desired in the ultimate copolymer and added continuously to the reaction medium throughout the course of the reaction. The various details of the polymerization method should be so selected in order to produce polymers or copolymers of substantially uniform physical and chemical characteristics.

The reactions may be catalyzed with a wide variety of free radical producing substances, for example, the peroxy compounds, and preferably those which are water-soluble, for example, hydrogen peroxide, sodium peroxide, potassium persulfate, calcium percarbonate, and other salts of peroxy acids. In the preparation of some of the copolymers of acrylonitrile and the N-heterocyclic monomers, the azo catalysts are often found to be effective. Suitable azo catalysts are azo-2,2'-diisobutyronitrile and dimethyl-2,2'-azodiisobutyrate, 2,2'-azobis 2,4-dimethylvaleronitrile, and 2,2'-azodiisobutyramide. In addition, diazoaminobenzene and its derivatives may be employed as catalysts. The azo catalysts are also found to be desirable in the preparation of the blending polymers, and particularly where a substantial proportion of the polymer is the N-heterocyclic monomer. The principal polymer for blending is preferably prepared in the presence of an alkali metal salt of peroxysulfuric acid.

The emulsion or dispersing agents used in the practice of this invention may be any compound which has both a hydrophilic and a hydrophobic radical. Suitable emulsifying or dispersing agents include the common soaps, such as sodium stearate and other alkali metal salts of high molecular weight, carboxylic acids and mixtures thereof as obtained by the saponification of animal and vegetable fats, the salts of sulfonated hydrocarbons, for example, the alkali metal salts of sulfonated paraffins, sulfonated naphthalenes, and sulfonated alkylbenzenes, the salts of formaldehyde condensed sulfonic acids and particularly the sodium salt of formaldehyde condensed alkylaryl sulfonic acids, the salts of triethanolamine and other "amino soaps," and alkali salts of sulfuric half esters of fatty alcohols.

If desired, the various classes of copolymers may be prepared by the "redox" method in the presence of sulfur dioxide, sodium bisulfite, sodium thiosulfate, and other compounds containing sulfur in the lower valent stage. The use of the "redox" system usually permits operation at lower temperature and results in the formation of copolymers of high molecular weight.

The polymerizations may also be conducted in the presence of molecular weight regulators, for example, t-dodecyl mercaptan, thioglycolic acid, thiourea, mercaptobenzothiazole, and carbon tetrachloride. These and other well-known regulators prevent the formation of very high molecular weight polymer increments and tend to induce a more uniform size of polymer molecules.

The polymerization reactions are preferably initiated by heating a reactor containing water to a temperature under which the polymerization is to be conducted. The aqueous medium is then charged with a catalyst with at least some of the catalyst, dispersing agent, regulator, and "redox" agent, if there are to be used. The reaction medium is then vigorously agitated by a mechanical stirrer or by tumbling the reactor. When all of the proper conditions for polymerization exist in the reactor, the monomers either pre-mixed or in separate streams are added gradually in the proportions desired in the copolymer. It is desirable to add the monomers at a rate substantially that in which they are combining in the copolymer. In this manner substantially uniform reaction conditions are maintained in the vessel. Similarly, the catalyst, emulsifying agent, and other reagents are added gradually or intermittently throughout the course of the reaction so as to maintain precisely or approximately a uniform concentration of the essential reagents within the reactor at all times. The reaction is then conducted until all the predetermined lot of monomers is charged. At this point the reaction is terminated.

In the practice of this invention it is desirable to maintain substantially uniform reaction conditions. This may be done by adding the monomers at a fixed constant rate, or by maintaining the reaction temperature at a substantially constant level. A preferred method of conducting the reaction utilizes operation at the reflux temperature, and when this method is used it has been found desirable to add the monomers at a varying rate so as to maintain a constant temperature of reflux within the vessel. Operation in this manner will maintain the same quantity and proportion of monomers in the reaction vessel throughout the entire reaction, but the proportion of monomers will usually be somewhat different from the proportions which are polymerizing to form the copolymers. Thus, in order to maintain a substantially uniform proportion in the polymer it is desirable to determine the relationship of the proportions in the vessel to the proportions in the resulting copolymer. By initially charging the reaction vessel with the proportions of monomers which are required in the vessel to form the copolymer of desired proportions, and by adding the monomer throughout the reaction in the proportions desired in the copolymer and maintaining operation at constant reflux temperature, copolymers very uniform in chemical and physical properties will be obtained. It will be apparent that since all of the predetermined lot of monomers has been added, the proportion of monomers in the vessel will change due to the depletion of the more active monomer. At this point it is desirable to interrupt the reaction by removing one of the essential conditions of operation, for example, by lowering the temperature, by destroying the catalyst or by rapidly steam distilling off unreacted monomers.

Upon the completion of the polymerization an emulsion or a suspension of solid polymer in the aqueous medium will be obtained. Although some of these dispersions can be filtered, many are stable emulsions which must necessarily be precipitated by the addition of a suitable reagent, for example, aluminum sulfate, sodium chloride, or another electrolyte, or an alcohol, such as ethanol, or by freezing, rapid agitation, or other well-known means for breaking emulsions.

The solid polymers are substantially free of moisture or can be made so by drying in any conventional oven or by other means known to the art.

The copolymers of acrylonitrile and the heterocyclic nitrogen monomers and the blends of non-dyeable acrylonitrile polymers with minor proportions of the polymers or copolymers of the N-heterocyclic monomers, may be spun into fibers or fabricated into films by procedures well-known to the art. The fibers and films prepared in this manner will be found to have physical properties greatly superior to all natural fibers and most synthetic fibers, and at the same time have dye-receptivity comparable or superior to natural fibers, such as wool.

Further details of the preparation of the new monomers and the preparation and use of the new copolymers from said monomers are set forth with respect to the following specific illustrative examples. Unless otherwise specified all parts and percentages are by weight.

*Example I*

132 grams of allyloxyacetonitrile were treated with 44 grams of methanol and dry hydrogen chloride in an ether solution at 0° to —10° C. to give 162 grams of the corresponding imido ester hydrochloride. This amounted to a yield of 72%. The 162 grams of the imido ester hydrochloride was suspended in one liter of dry, alcohol-free chloroform, and 120 grams (two molar equivalents) of ethylenediamine, which had been freshly distilled from NaOH pellets, was added. The resulting mixture was boiled with the evolution of ammonia. Boiling was continued until no more ammonia evolved. The chloroform was removed by vacuum distillation, and the residue was treated with excess potassium carbonate solution. After extraction with chloroform, the product was isolated by vacuum distillation through a fractionating column at 10 mm. pressure. A yield of 2-allyloxymethyl imidazoline of 82.5 grams was obtained or 59.8%. The product had a boiling point of 114–117° C. and was a mobile yellow liquid which crystallized to a solid when cooled to approximately 0° C.

*Example II*

A pressure bottle was charged with 2.4 grams of the 2-allyloxymethyl imidazoline prepared in Example I, 27.6 grams of acrylonitrile, 0.3 gram of Porofor N (azo-bis-isobutyronitrile) and 100 ml. of distilled water. The mixture was heated for two hours at a temperature of 75° C. A light cream colored slurry was obtained which contained 24 grams of a polymer containing approximately 92% acrylonitrile and 8% 2-allyloxymethyl imidazoline. One gram of the resultant polymer was dissolved in 5 ml. of N,N-dimethylacetamide to give a clear, yellow solution. The clear, yellow solution was cast into a film, by conventional procedure, and the film dyed with Wool Fast Scarlet dye. A bright scarlet color resulted which was much better than the dyeing obtained on a like film of polyacrylonitrile.

It is to be understood that changes and variations may be made without departing from the spirit and scope of the invention as defined in the appended claims.

We claim:
1. A compound having the general formula:

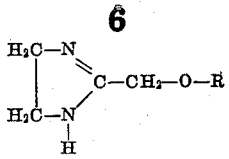

wherein R is an alkenyl radical selected from the group consisting of vinyl, allyl, methallyl, ethallyl and isopropenyl.
2. 2-vinyloxymethylimidazoline.
3. 2-allyloxymethyl imidazoline.
4. 2-methallyloxymethylimidazoline.
5. 2-ethallyloxymethylimidazoline.
6. 2-isopropenyloxymethyl imidazoline.

No references cited.